(12) United States Patent
Chen et al.

(10) Patent No.: US 9,074,652 B2
(45) Date of Patent: Jul. 7, 2015

(54) PASSIVE SKYHOOK AND GROUNDHOOK DAMPING VIBRATION ISOLATION SYSTEM

(75) Inventors: Long Chen, Jiangsu (CN); Xiaoliang Zhang, Jiangsu (CN); Jiamei Nie, Jiangsu (CN); Haobin Jiang, Jiangsu (CN); Ruochen Wang, Jiangsu (CN)

(73) Assignee: JIANGSU UNIVERSITY (CN)

( * ) Notice: Subject to any disclaimer, the term of this patent is extended or adjusted under 35 U.S.C. 154(b) by 0 days.

(21) Appl. No.: 14/240,748

(22) PCT Filed: Dec. 14, 2011

(86) PCT No.: PCT/CN2011/083991
§ 371 (c)(1),
(2), (4) Date: Feb. 25, 2014

(87) PCT Pub. No.: WO2013/071667
PCT Pub. Date: May 23, 2013

(65) Prior Publication Data
US 2014/0246820 A1    Sep. 4, 2014

(30) Foreign Application Priority Data

Nov. 15, 2011   (CN) .......................... 2011 1 0360020

(51) Int. Cl.
*F16F 7/10*      (2006.01)
*F16F 13/00*     (2006.01)
(Continued)

(52) U.S. Cl.
CPC .............. *F16F 13/00* (2013.01); *F16F 15/022* (2013.01); *B60G 15/067* (2013.01); *F16F 15/02* (2013.01);
(Continued)

(58) Field of Classification Search
CPC .......... F16F 15/02; F16F 15/022; F16F 13/00; B60G 15/02; B60G 15/04; B60G 15/06; B60G 15/067
USPC ............ 267/140.11, 140.12, 141.2, 136, 174, 267/195, 292; 188/378–380, 299.1; 280/124.1, 124.108; 248/550, 560, 248/562, 636, 638
See application file for complete search history.

(56) References Cited

U.S. PATENT DOCUMENTS 3,290,035 A * 12/1966 Enke ............................. 267/225
6,315,094 B1 * 11/2001 Griffin et al. ................. 188/379
(Continued)

FOREIGN PATENT DOCUMENTS

CN          101774341 A        7/2010
CN          101954846 A        1/2011
(Continued)

OTHER PUBLICATIONS

PCT/CN2011/083991 International File Date: Dec. 14, 2011—International Search Report; Jiangsu University; 3 pages.
(Continued)

*Primary Examiner* — Vishal Sahni
(74) *Attorney, Agent, or Firm* — Schmeiser, Olsen & Watts, LLP

(57) ABSTRACT

A passive skyhook and groundhook damping vibration isolation system and a method for determining parameters thereof, which utilize the anti-resonance of an "inerter ($b_1$, $b_2$)-spring ($k_1$, $k_2$)-mass ($m_1$, $m_2$)" vibration state converting system to convert the resonance of the isolated mass into the resonance of the inerter, thus eliminating the resonance of the isolated mass, is provided. A damper spans and is connected in parallel to the inerter, preventing the damper from spanning and being connected in parallel to the isolated mass. The damper is not required to connect to an inertial reference frame, and the vibration of the isolated mass is suppressed.

13 Claims, 10 Drawing Sheets

(51) Int. Cl.
  *B60G 15/02* (2006.01)
  *B60G 15/04* (2006.01)
  *B60N 2/50* (2006.01)
  *B62D 33/06* (2006.01)
  *F16F 15/02* (2006.01)
  *B60G 15/06* (2006.01)

(52) U.S. Cl.
  CPC ............... *B60G 15/02* (2013.01); *B60G 15/04* (2013.01); *B60G 15/06* (2013.01); *B60N 2/50* (2013.01); *B62D 33/0604* (2013.01)

(56) References Cited

U.S. PATENT DOCUMENTS

| | | | | |
|---|---|---|---|---|
| 7,316,303 | B2* | 1/2008 | Smith | 188/292 |
| 2009/0108510 | A1 | 4/2009 | Wang et al. | |
| 2009/0139225 | A1 | 6/2009 | Wang et al. | |
| 2010/0057260 | A1* | 3/2010 | Fallahi | 700/280 |

FOREIGN PATENT DOCUMENTS

| | | |
|---|---|---|
| CN | 101954847 A | 1/2011 |
| CN | 101961975 A | 2/2011 |
| CN | 201891793 U | 7/2011 |
| DE | 10034603 A1 | 1/2002 |

OTHER PUBLICATIONS

D. Karnopp, M. J. Crosby, R. A. Harwood. "Vibration Control Using Semi-Active Force Generators", Journal of Engineering for Industry, 96(2):6-9-626, 1974).

C. R. Fuller, S. J. Elliott, P. A. Nelson. "Active Control of Vibration", Academic Press, New York,1996.

S. Rakheja, "Vibration and Shock Isolation Performance of a Semi-Active 'on-off' Damper", Journal of Vibration, Acoustics, Stress, and Reliability in Design, 107(4):398-403, 1985.

* cited by examiner

US 9,074,652 B2

PASSIVE SKYHOOK AND GROUNDHOOK DAMPING VIBRATION ISOLATION SYSTEM

FIELD OF TECHNOLOGY

The following relates the technical field of vibration attenuation and vibration isolation, particularly to a passive skyhook and groundhook damping vibration isolation system.

BACKGROUND

Vibration isolation is a classical problem in the mechanical engineering. Many machines, for example, cars, trains, heavy machinery, landing gears of airplanes, space landers, etc., require a vibration isolation system. The purpose of vibration isolation is to reduce the transmission of external disturbance to the sensitive parts of the system. A suspension, consisting of a spring and a damping element, may reduce the response of the sensitive parts of the system to the external disturbance, thus achieving the purpose of vibration isolation. Isolation systems are usually designed to attenuate either shock or persistent harmonic excitations.

People have been committed to the design and application research of passive vibration isolation systems for a long time. However, researchers have found that conventional passive vibration isolation systems are unable to harmonize the conflict between the resonant response and the high-frequency attenuation, thus the further improvement of the performance of the passive vibration isolation systems is restricted. To solve this problem, Karnopp and Crosby have proposed an ideal skyhook damping that can attenuate the resonant response without increasing the high-frequency transmissibility (D. Karnopp, M. J. Crosby, R. A. Harwood. "Vibration Control Using Semi-Active Force Generators", Journal of Engineering for Industry, 96(2):6-9-626, 1974). A viscous damper in the vibration isolation system of the ideal skyhook damping is required to be connected to an inertial reference frame. However, in many practical applications, it is impossible that one end of a damper is connected to the isolated mass while the other end thereof is connected to an inertial reference frame. A vehicle suspension system is an obvious example. FIG. 1 shows a simplified ideal-skyhook damping vehicle suspension system. FIG. 2 shows an equivalent mechanical network of FIG. 1. One terminal of the isolated mass $m_2$ is the center of mass, while the other terminal thereof is a fixed point in the inertial reference frame. For a system standing still relative to the inertial reference frame, the inertial reference frame becomes a common end of the damper $c_{sky}$ and the isolated mass $m_2$. Therefore, the damper $c_{sky}$ may span and be connected in parallel to the isolated mass $m_2$ via the inertial reference frame to absorb the vibration energy of the mass $m_2$ and to suppress the resonance of the mass $m_2$. However, for a system moving relative to the inertial reference frame, for example, a vehicle suspension, the damper $c_{sky}$ is unable to span the isolated mass $m_2$ without the inertial reference frame as a natural common end. This is the root cause why people think that an ideal skyhook damping cannot be realized passively.

To achieve the vibration isolation effect of the ideal skyhook damping, a replaceable implementation way is employed to realize the skyhook damping, including active and semi-active implementation ways. In the active implementation way, a sensor, an actuator and electronic control technology are employed to realize the skyhook damping (C. R. Fuller, S. J. Elliott, P. A. Nelson. "Active Control of Vibration", Academic Press, New York,1996). In the semi-active implementation way, an electronically-controlled damping adjustment method is employed to realize the skyhook damping (S. Rakheja, "Vibration and Shock Isolation Performance of a Semi-Active 'on-off' Damper", Journal of Vibration, Acoustics, Stress, and Reliability in Design, 107(4):398-403, 1985). Although the active and semi-active implementation ways can generate the expected effects in theory, the active and semi-active vibration isolation systems require external energy input, and have complex structure and poorer reliability than a passive vibration isolation system. Furthermore, during the vibration isolation, both an active vibration isolation system and a semi-active vibration isolation system will have three links, including the measurement by a sensor, the calculation by a controller and the execution by an actuation mechanism. There are many intermediate links. Furthermore, the errors and time-lag of the measurement by the sensor, the calculation by the controller and the actuation mechanism seriously affect the real-time performance and effectiveness of control, thus making the actual vibration isolation effect of the active and semi-active vibration isolation systems difficult to reach the expected effect in theory.

U.S. Pat. No. 6,315,094B1 disclosed a passive skyhook vibration isolation system, comprising a main vibration system and a dynamic vibration absorber with damping. In the main vibration system, a spring and a damper support a main mass. The dynamic vibration absorber with damping is attached onto the main mass of the main vibration system. The vibration of the main mass is suppressed by adjusting the parameters of the dynamic vibration absorber. In such a passive skyhook vibration isolation system, there is an irreconcilable conflict between the mass of the vibrator of the vibration absorber and the amplitude of the vibrator. According to the principle that the natural frequency of the vibration absorber is the same to that of the main vibration system, on one hand, if the amplitude of the vibrator is to be reduced, the stiffness of the spring of the vibration absorber is to be enhanced, and the mass of the vibrator is to be increased correspondingly. As a result, the mass attached onto the main mass will be increased certainly. Taking a car suspension system as example, the mass attached onto the car body will be 69 kg even though the minimum percentage of the mass of the vibrator to the main mass in this patent is 5%, given the mass of the car body is 1380 kg. Apparently, the kerb mass of the car increases. On the other hand, if the mass of the vibrator is to be reduced, the stiffness of the spring of the vibration absorber is to be reduced, thus the amplitude of the vibrator increases. Apparently, it is disadvantageous to the arrangement of the vibration absorber.

In conclusion, it may be found that there is an urgent demand for a passive skyhook and groundhook damping vibration isolation system, in order to overcome the shortcomings of the need of external energy input, complex structure, and poor reliability and real-time performance in active and semi-active implementation methods, simultaneously avoiding the problem of the conflict between the mass of a vibrator and the amplitude of the vibrator when a dynamic vibration absorber with damping is applied, harmonize the conflict between the resonant response and the high-frequency attenuation, and to suppress the resonance of the isolated mass without increasing the high-frequency transmissibility.

SUMMARY

The present invention provides a passive skyhook and groundhook damping vibration isolation system, which can overcome the shortcomings in the above implementation methods and can achieve a vibration isolation effect close to that of the ideal skyhook and groundhook damping.

The present invention employs an inerter (also referred to as inertial mass accumulator or inertial accumulator, referring to U.S. Pat. No. 7,316,303B2, No. 20090108510A1 and No. 20090139225A1) as a primary element of the system.

The inertial mass accumulation suspensions disclosed in Chinese Patents No. 201010281331.9, No. 201010281336.1 and No. 201010281307.5 are employed basically to reduce the vertical acceleration of a vehicle body and the dynamic load of tires, improve ride comfort of the vehicle and-tire grip, and to harmonize the conflict between ride comfort and tire grip. However, the above patents had not yet provided any specific suspension parameters having a decisive impact on the performance of the suspensions or any relations between the parameters, nor a method for determining these parameters. To realize the functions of the ideal skyhook and groundhook damping passively, the present invention discloses not only a passive skyhook and groundhook damping vibration isolation system, but also a method for determining the parameters of this system.

The technical problem to be solved by the present invention is to provide a passive skyhook and groundhook damping vibration isolation system, in order to overcome the technical shortcomings of the need of external energy input, complex structure, and poor reliability and real-time performance in active and semi-active implementation methods, and to solve the technical problem that the damper in an ideal skyhook and groundhook damping vibration isolation system is required to be connected to an inertial reference frame. The passive skyhook and groundhook damping vibration isolation system does not require the damper to connect to an inertial reference frame, maximizes the ideal skyhook and groundhook damping, and suppresses the vibration of the isolated mass.

The following technical solutions are employed by the present invention: the anti-resonance of an "inerter-spring-mass" vibration state converting system is utilized to convert the resonance of the isolated mass into the resonance of the inerter, thus eliminating the resonance of the isolated mass. On this base, a damper spans and is connected in parallel to the inerter, thus preventing the damper from spanning and being connected in parallel to the isolated mass, and overcoming the technical bias that the damper in ideal skyhook and groundhook damping vibration isolation system is required to be connected to an inertial reference frame.

The passive skyhook and groundhook damping vibration isolation system disclosed by the present invention is a system with two degrees of freedom (2DOF), comprising a "spring k-damper c" parallel body, a "spring $k_t$-damper $c_t$" parallel body, a skyhook damper $c_{sky}$, a groundhook damper $c_{gnd}$, a moving foundation, a mass $m_1$ vibration state converting system and a mass $m_2$ vibration state converting system.

The "spring $k_t$-damper $c_t$" parallel body consists of a spring $k_t$ and a damper $c_t$ connected in parallel; the mass $m_1$ vibration state converting system comprises a mass $m_1$ and a mass $m_1$ vibration state converter, the mass $m_1$ vibration state converter consisting of a spring $k_1$ and an inerter $b_1$ connected in parallel, the mass $m_1$ vibration state converter being connected in series to and supporting the mass $m_1$; the "spring $k_t$-damper $c_t$" parallel body is connected in series to the mass $m_1$ vibration state converter and supports the whole mass $m_1$ vibration state converting system via the mass $m_1$ vibration state converter; the moving foundation is connected in series to and supports the "spring $k_t$-damper $c_t$" parallel body; the groundhook damper $c_{gnd}$ is connected in parallel to the mass $m_1$ vibration state converter to form the parallel body of the mass $m_1$ vibration state converter and the groundhook damper $c_{gnd}$.

The "spring k-damper c" parallel body consists of a spring k and a damper c connected in parallel; the mass $m_2$ vibration state converting system comprises a mass $m_2$ and a mass $m_2$ vibration state converter, the mass $m_2$ vibration state converter consisting of a spring $k_2$ and an inerter $b_2$ connected in parallel, the mass $m_2$ vibration state converter being connected in series to and supporting the mass $m_2$; the "spring k-damper c" parallel body is connected in series to the mass $m_2$ vibration state converter, and supports the whole mass $m_2$ vibration state converting system via the mass $m_2$ vibration state converter; the mass $m_1$ is connected in series to and supports the "spring k-damper c" parallel body; the skyhook damper $c_{sky}$ is connected in parallel to the mass $m_2$ vibration state converter to from the parallel body of the mass $m_2$ vibration state converter and the skyhook damper $c_{sky}$.

In the present invention, the parallel body of the mass $m_1$ vibration state converter and the skyhook damper $c_{gnd}$ in the 2DOF passive skyhook and groundhook damping vibration isolation system is omitted, and two ends of the "spring $k_t$-damper $c_t$" parallel body are directly connected in series to the mass $m_1$ and the moving foundation, respectively, to form a 2DOF passive skyhook damping vibration isolation system.

In the present invention, the parallel body of the mass $m_2$ vibration state converter and the skyhook damper $c_{sky}$ in the 2DOF passive skyhook and groundhook damping vibration isolation system is omitted, and two ends of the "spring k-damper c" parallel body are directly connected in series to the mass $m_1$ and the mass $m_2$, respectively, to form a 2DOF passive groundhook damping vibration isolation system.

In the present invention, the "spring $k_t$-damper $c_t$" parallel body, the parallel body of the mass $m_1$ vibration state converter and the skyhook damper $c_{gnd}$ and the mass $m_1$ in the 2DOF passive skyhook and groundhook damping vibration isolation system are omitted, and the "spring k-damper c" parallel body is directly connected in series to the moving foundation to form an SDOF (Single Degree of Freedom) passive skyhook damping vibration isolation system.

In the 2DOF passive skyhook and groundhook damping vibration isolation system disclosed by the present invention, the mass of the mass $m_2$ is $m_2$, the stiffness of the spring $k_2$ is $k_2$, the inerterance of the inerter $b_2$ is $b_2$, the damping of the skyhook damper $c_{sky}$ is $c_{sky}$, the stiffness of the spring k is k, the damping of the damper c is c; the mass of the mass $m_1$ is $m_1$, the stiffness of the spring $k_1$ is $k_1$, the inerterance of the inerter $b_1$ is $b_1$, the damping of the groundhook damper $c_{gnd}$ is $c_{gnd}$, the stiffness of the spring $k_t$ is $k_t$, and the damping of the damper $c_t$ is $c_t$.

A method for determining parameters $k_1$, $b_1$, $k_2$ and $b_2$ of the 2DOF passive skyhook and groundhook damping vibration isolation system includes the following steps.

Step 1: The skyhook damper $c_{sky}$ and the groundhook damper $c_{gnd}$ in the 2DOF passive skyhook and groundhook damping vibration isolation system are omitted to obtain a conventional 2DOF passive vibration isolation system; the known parameters of the conventional 2DOF passive vibration isolation system are as follows: the mass of the mass $m_2$ is $m_2$, the stiffness of the spring k is k, the damping of the damper c is c, the mass of the mass $m_1$ is $m_1$, the stiffness of the spring $k_t$ is $k_t$, and the damping of the damper $c_t$ is $c_t$; and the resonance frequency $\omega_2$ of the mass $m_2$ in the conventional 2DOF passive vibration isolation system is calculated according to the following equation:

$$\omega_2 = \sqrt{k/m_2}.$$

Step 2: The anti-resonance frequency $\omega_{2A}$ of the mass $m_2$ vibration state converting system is calculated according to the following equation:

$$\omega_{2A}=\sqrt{k_2/b_2}.$$

Step 3: A relational expression of $k_2$ and $b_2$ is determined according to the principle that $\omega_{2A}$ is approximately equal to $\omega_2$:

$$k/m_2=k_2/b_2,$$

where, k and m are known parameters, and $k_2$ and $b_2$ are parameters to be determined.

Step 4: The resonance frequency $\omega_1$ of the mass $m_1$ in the conventional 2DOF passive vibration isolation system is calculated according to the following equation:

$$\omega_1=\sqrt{(k_t+k)/m_1}.$$

Step 5: The anti-resonance frequency $\omega_{1A}$ of the mass $m_1$ vibration state converting system is calculated according to the following equation:

$$\omega_{1A}=\sqrt{k_1/b_1}.$$

Step 6: A relational expression of $k_1$ and $b_1$ is determined according to the principle that $\omega_{1A}$ is approximately equal to $\omega_1$:

$$(k_t+k)/m_1=k_1/b_1,$$

where, $k_t$, k and $m_1$ are known parameters, and $k_1$ and $b_1$ are parameters to be determined.

Step 7: The values of parameters $k_1$ and $k_2$ are determined. Calculations and tests show that the performance of the passive skyhook and groundhook damping vibration isolation system disclosed by the present invention will be closer to that of an ideal skyhook and groundhook damping vibration isolation system if the values of $k_1$ and $k_2$ are smaller. However, too small values of $k_1$ and $k_2$ will result in a too large relative stroke between the mass $m_1$ and the mass $m_2$ and between the mass $m_1$ and the moving foundation. To avoid a too large relative stroke, $k_1$ should be greater than or equal to $k_t/3$, and $k_2$ should be greater than or equal to k/3. Meanwhile, the values of $k_1$ and $k_2$ cannot be too large. Too large values of $k_1$ and $k_2$ will deteriorate the performance of the passive skyhook and groundhook damping vibration isolation system. Calculations and tests show that the performance of the passive skyhook and groundhook damping vibration isolation system disclosed by the present invention can be close to that of an ideal skyhook and groundhook damping vibration isolation system when $k_1$ is less than or equal to $k_t$ and $k_2$ is less than or equal to k. Therefore, in the case of $k_t/3 \leq k_1 \leq k_t$ and $k/3 \leq k_2 \leq k$, that is, $k_1$ is within $[k_t/3, k_t]$ and $k_2$ is within $[k/3, k]$, the passive skyhook and groundhook damping vibration isolation system can achieve the effect required by the present invention.

Step 8: The known parameters of the ideal 2DOF skyhook and groundhook damping vibration isolation system are as follows: the mass of the mass $m_1$ is $m_1$, the mass of the mass $m_2$ is $m_2$, the stiffness of the spring k is k, the damping of the damper c is c, the stiffness of the spring $k_t$ is $k_t$, the damping of the damper $c_t$ is $c_t$, the damping of the skyhook damper $c_{sky}$ is $c_{sky}$, and the damping of the groundhook damper $c_{gnd}$ is $c_{gnd}$. The values of $k_1$ and $k_2$ are selected from the ranges determined in Step 7, the specific values of parameters $b_1$ and $b_2$ are determined finally according to the relation of $k_2$ and $b_2$ determined in Step 3 and the relation of $k_1$ and $b_1$ determined in Step 6:

$$b_1 = \frac{k_1}{(k_t+k)}m_1, \quad b_2 = \frac{k_2}{k}m_2.$$

With respect to the skyhook damping vibration isolation systems using active and semi-active implementation methods, the present invention is simple and reliable and requires no energy input; with respect to the passive skyhook damping vibration isolation systems using dynamitic vibration absorbers with damping, the present invention avoids the problem on the conflict between the mass of a vibrator and the amplitude of the vibrator; and, with respect to conventional passive vibration isolation systems, the performance of the vibration isolation system disclosed by the present invention is improved significantly.

In the figures: 1—Mass $m_2$; 2—Spring $k_2$; 3—Inerter $b_2$; 4—Skyhook damper $c_{sky}$; 5—Spring k; 6—Damper c; 7—Groundhook damper $c_{gnd}$; 8—Mass $m_1$; 9—Spring $k_t$; 10—Damper $c_t$; 11—Moving foundation; 12—Spring $k_1$; 13—Inerter $b_1$; 14—Lever $L_2$; 15—Lever $L_1$; 16—Fixed rod $R_2$; 17—Fixed rod $R_1$; 18—Slideway; 19—Torsion spring A;

20—Torsion damper A; 21—Torsion spring B; 22—Torsion damper B; 23—Skyhook damping pillar; 24—Groundhook damping pillar; 25—Flywheel chamber A; 26—Flywheel A; 27—Screw support A; 28—Nut A; 29—Screw A; 30—Stroke chamber A; 31—Viscous oil; 32—Cylinder A; 33—Piston A with a damping hole; 34—Oil; 35—Piston rod A; 36—Flywheel chamber B; 37—Flywheel B; 38—Screw support B; 39—Nut B; 40—Screw B; 41—Stroke chamber B; 42—Cylinder B; 43—Piston B with a damping hole; 44—Piston rod B; 45—Mass $m_2$ vibration state converter; 46—Mass $m_2$ vibration state converting system; 47—Mass $m_1$ vibration state converter, 48—Mass $m_1$ vibration state converting system.

DETAILED DESCRIPTION

Figure 1:
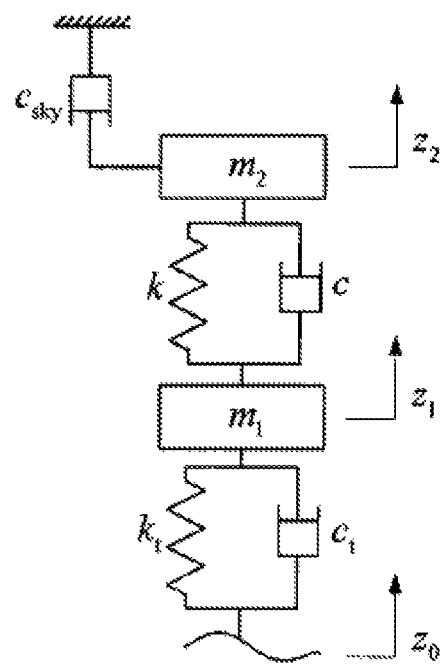
FIG. 1 is a schematic diagram of an ideal skyhook damping vehicle suspension system.
Figure 2:
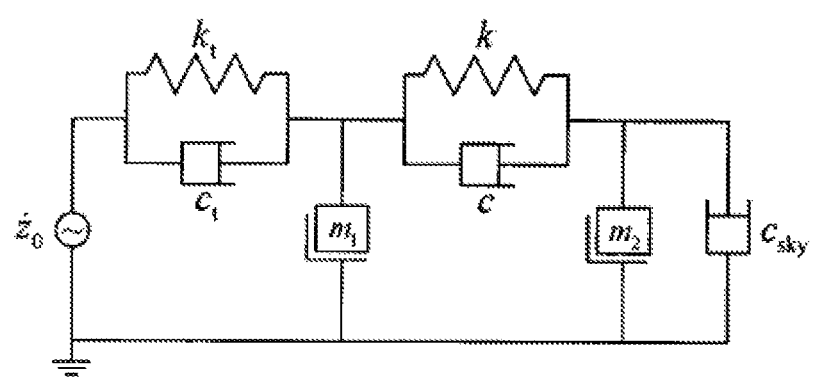
FIG. 2 is a schematic diagram of an equivalent mechanical network of an ideal skyhook damping vehicle suspension system.
Figure 3:
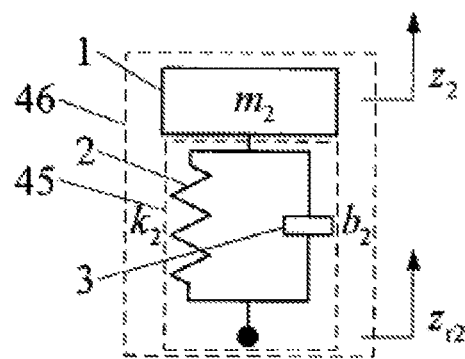
FIG. 3 is a schematic diagram of a mass $m_2$ vibration state converting system.

As shown in FIG. 3, a mass $m_2$ vibration state converter 45 consists of a spring $k_2$ 2 and an inerter $b_2$ 3 connected in parallel. The mass $m_2$ vibration state converter 45 is connected in series to and supports a mass $m_2$ 1, thus, a mass $m_2$ vibration state converting system forms. As a simple system, the movement of the mass $m_2$ vibration state converting system may be described by the following second-order differential equation:

$$m_2\ddot{z}_2 + b_2(\ddot{z}_2 - \ddot{z}_{r2}) + k_2(z_2 - z_{r2}) = 0,$$

where, $z_2$ is the displacement of the mass $m_2$ 1, $z_{r2}$ is the displacement input of the system, $k_2$ and $b_2$ are the stiffness of the spring $k_2$ 2 and the interance of the inerter $b_2$ 3.

Laplace conversion is performed to the above equation to obtain the following equation:

$$\frac{Z_2(s)}{Z_{r2}(s)} = \frac{(b_2 s^2 + k_2)}{(m_2 + b_2)s^2 + k_2},$$

supposed that $s=j\omega$, the ratio of amplitudes of $z_2$ and $z_{r2}$ may be obtained according to the above equation, so that the displacement transmissibility of the system is as follows:

$$T(j\omega) = \left| \frac{Z_2(j\omega)}{Z_{r2}(j\omega)} \right| = \left| \frac{-b_2\omega^2 + k_2}{-(m_2 + b_2)\omega^2 + k_2} \right|.$$

In the case of $T(j\omega)=0$, the system will have anti-resonance and the anti-resonance frequency $\omega_{2A}$ is $\sqrt{k_2/b_2}$. At this moment, the amplitude of the mass $m_2$ 1 is 0, while the inerter $b_2$ 3 is in a resonant state. Therefore, when the mass $m_2$ 1 is in a resonant state in a certain system A, the mass $m_2$ 1 in the system A is replaced with the mass $m_2$ vibration state converting system 46, and the anti-resonance frequency $\omega_{2A}$ is made close to the resonance frequency of the mass $m_2$ 1 in the system A. Thus, the resonance of the mass $m_2$ 1 may be converted into the resonance of the inerter $b_2$ 3 so as to eliminate the resonance of the mass $m_2$ 1, thereby providing a solution for the passive implementation of the ideal skyhook and groundhook damping.

Figure 4:
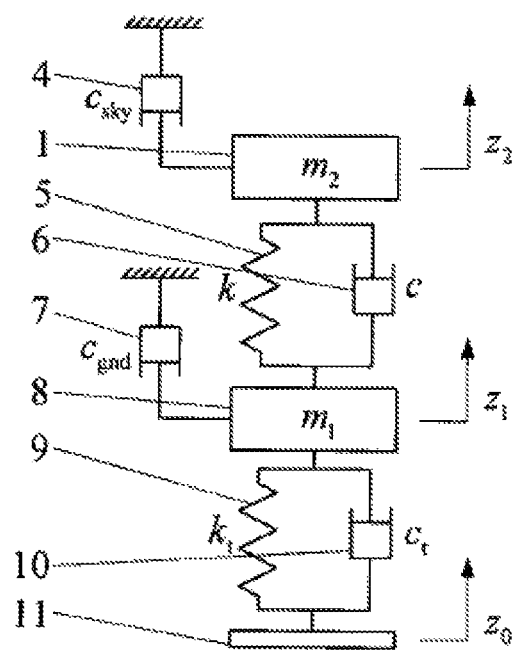
FIG. 4 is a schematic diagram of an ideal 2DOF skyhook and groundhook damping vibration isolation system.

As shown in FIG. 4, an ideal 2DOF (Two Degrees of Freedom) skyhook and groundhook damping vibration isolation system comprises a mass $m_1$ 8 and a mass $m_2$ 1, a "spring k 5-damper c 6" parallel body, a "spring $k_t$ 9-damper $c_t$ 10" parallel body, a skyhook damper $c_{sky}$ 4 and a groundhook damper $c_{gnd}$ 7. Wherein, the "spring k 5-damper c 6" parallel body consists of a spring k 5 and a damper c 6 connected in parallel. The "spring $k_t$ 9-damper $c_t$ 10" parallel body consists of a spring $k_t$ 9 and a damper $c_t$ 10 connected in parallel. One end of the "spring k 5-damper c 6" parallel body is connected in series to the mass $m_2$ 1, while the other end thereof is connected in series to the mass $m_1$ 8. The mass $m_1$ 8 supports the mass $m_2$ 1 via the "spring k 5-damper c 6" parallel body. One end of the "spring $k_t$ 9-damper $c_t$ 10" parallel body is connected in series to the mass $m_1$ 8, while the other end thereof is connected in series to a moving foundation 11. The moving foundation 11 supports the mass $m_1$ 8 via the "spring $k_t$ 9-damper $c_t$ 10" parallel body. One ends of the skyhook damper $c_{sky}$ 4 and the groundhook damper $c_{gnd}$ 7 are connected to the mass $m_2$ 1 and the mass $m_1$ 8, respectively, while the other ends thereof are connected to an inertial reference frame.

Figure 5:
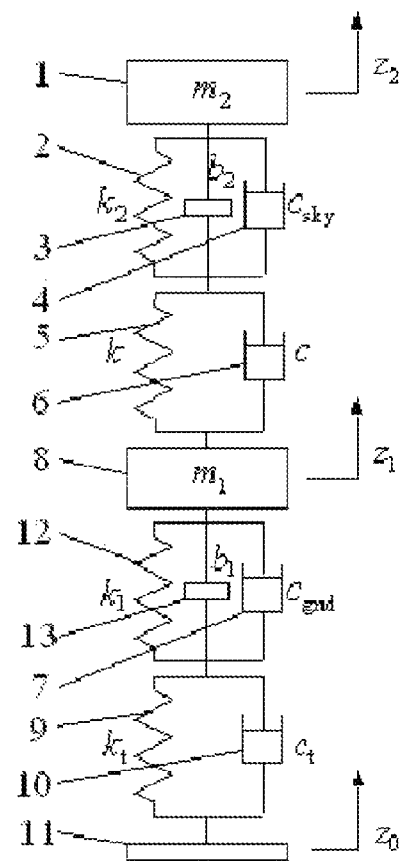
FIG. 5 is a schematic diagram of a 2DOF passive skyhook and groundhook damping vibration isolation system.

As shown in FIG. 5, as a passive implementation system of the ideal 2DOF skyhook and groundhook damping vibration isolation system, a 2DOF passive skyhook and groundhook damping vibration isolation system comprises a "spring k 5-damper c 6" parallel body, a "spring $k_t$ 9-damper $c_t$ 10" parallel body, a skyhook damper $c_{sky}$ 4, a groundhook damper $C_{gnd}$ 7, a moving foundation 11, a mass $m_1$ vibration state converting system 48 and a mass $m_2$ vibration state converting system 46.

The "spring $k_t$ 9-damper $c_t$ 10" parallel body consists of a spring $k_t$ 9 and a damper $c_t$ 10 connected in parallel. The mass $m_1$ vibration state converting system 48 comprises a mass $m_1$ 8 and a mass $m_1$ vibration state converter 47. The mass $m_1$ vibration state converter 47 consists of a spring $k_1$ 12 and an inerter $b_1$ 13 connected in parallel. The mass $m_1$ vibration state converter 47 is connected in series to and supports the mass $m_1$ 8. The "spring $k_t$ 9-damper $c_t$ 10" parallel body is connected in series to the mass $m_1$ vibration state converter 47 and supports the whole mass $m_1$ vibration state converting system 48 via the mass $m_1$ vibration state converter 47. The moving foundation 11 is connected in series to and supports the "spring $k_t$ 9-damper $c_t$ 10" parallel body. The groundhook damper $c_{gnd}$ 7 is connected in parallel to the mass $m_1$ vibration state converter 47 to form the parallel body of the mass $m_1$ vibration state converter 47 and the groundhook damper $c_{gnd}$ 7.

The "spring k 5-damper c 6" parallel body consists of a spring k 5 and a damper c 6 connected in parallel. The mass $m_2$ vibration state converting system 46 comprises a mass $m_2$ 1 and a mass $m_2$ vibration state converter 45. The mass $m_2$ vibration state converter 45 consists of a spring $k_2$ 2 and an inerter $b_2$ 3 connected in parallel. The mass $m_2$ vibration state converter 45 is connected in series to and supports the mass $m_2$ 1. The "spring k 5-damper c 6" parallel body is connected in series to the mass $m_2$ vibration state converter 45, and supports the whole mass $m_2$ vibration state converting system 46 via the mass $m_2$ vibration state converter 45. The mass $m_1$ is connected in series to and supports the "spring k 5-damper c 6" parallel body. The skyhook damper $c_{sky}$ 4 is connected in parallel to the mass $m_2$ vibration state converter 45 to from the parallel body of the mass $m_2$ vibration state converter 45 and the skyhook damper $c_{sky}$ 4.

In the 2DOF passive skyhook and groundhook damping vibration isolation system, the parallel body of the mass $m_1$ vibration state converter 47 and the groundhook damper $c_{gnd}$ 7 and the "spring $k_t$ 9-damper $c_t$ 10" parallel body are exchanged in position with each other, and the parallel body of the mass $m_2$ vibration state converter 45 and the skyhook damper $c_{sky}$ 4 and the "spring k 5-damper c 6" parallel body are exchanged in position with each other. The inerter $b_2$ 3 and the inerter $b_1$ 13 may be one of a rack and pinion inerter (referring to U.S. Pat. No. 6,315,094B1), a ballscrew inerter (referring to U.S. Publication No. 2009/0108510A1) and a hydraulic inerter (referring to U.S. Publication No. 2009/0139225A1).

In the 2DOF passive skyhook and groundhook damping vibration isolation system disclosed by the present invention, the mass of the mass $m_2$ 1 is $m_2$, the stiffness of the spring $k_2$ 2 is $k_2$, the inerterance of the inerter $b_2$ 3 is $b_2$, the damping of the skyhook damper $c_{sky}$ 4 is $c_{sky}$, the stiffness of the spring k 5 is k, the damping of the damper c 6 is c, the mass of the mass $m_1$ 8 is $m_1$, the stiffness of the spring $k_1$ 12 is $k_1$, the inerterance of the inerter $b_1$ 13 is $b_1$, the damping of the groundhook damper $c_{gnd}$ 7 is $c_{gnd}$, the stiffness of the spring $k_t$ 9 is $k_t$, and the damping of the damper $c_t$ 10 is $c_t$.

A method for determining parameters $k_1$, $b_1$, $k_2$ and $b_2$ of the 2DOF passive skyhook and groundhook damping vibration isolation system comprises the following steps.

Figure 6:
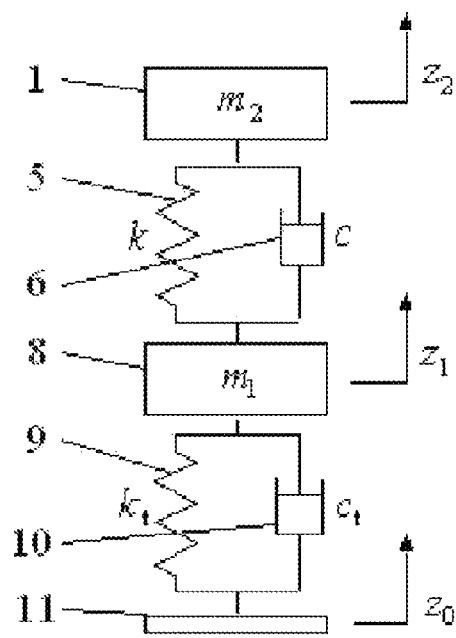
FIG. 6 is a schematic diagram of a conventional 2DOF passive vibration isolation system.

Step 1: In FIG. 4, the skyhook damper $c_{sky}$ 4 and the groundhook damper $c_{gnd}$ 7 in the ideal 2DOF skyhook and groundhook damping vibration isolation system are omitted to obtain a conventional 2DOF passive vibration isolation system, as shown in FIG. 6; the known parameters of the conventional 2DOF passive vibration isolation system are as follows: the mass of the mass $m_2$ 1 is $m_2$, the stiffness of the spring k 5 is k, the damping of the damper c 6 is c, the mass of the mass $m_1$ 8 is $m_1$, the stiffness of the spring $k_t$ 9 is $k_t$, and the damping of the damper $c_t$ 10 is $c_t$; and the resonance frequency $\omega_2$ of the mass $m_2$ 1 in the conventional 2DOF passive vibration isolation system is calculated according to the following equation:

$$\omega_2 = \sqrt{k/m_2}.$$

Step 2: As shown in FIG. 3, the anti-resonance frequency $\omega_{2A}$ of the mass $m_2$ vibration state converting system 46 is calculated according to the following equation:

$$\omega_{2A} = \sqrt{k_2/b_2}.$$

Step 3: A relational expression of $k_2$ and $b_2$ is determined according to the principle that $\omega_{2A}$ is approximately equal to $\omega_2$:

$$k/m_2 = k_2/b_2,$$

where, k and m are known parameters, and $k_2$ and $b_2$ are parameters to be determined.

Step 4: The resonance frequency $\omega_1$ of the mass $m_1$ 8 in the conventional 2DOF passive vibration isolation system is calculated according to the following equation:

$$\omega_1 = \sqrt{(k_t+k)/m_1}.$$

Figure 7:
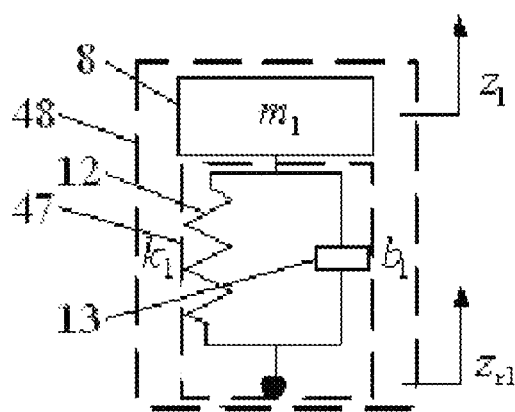
FIG. 7 is a schematic diagram of a mass $m_1$ vibration state converting system.

Step 5: As shown in FIG. 7, the anti-resonance frequency $\omega_{1A}$ of the mass $m_1$ vibration state converting system 48 is calculated according to the following equation:

$$\omega_{1A} = \sqrt{k_1/b_1}.$$

Step 6: A relational expression of $k_1$ and $b_1$ is determined according to the principle that $\omega_{1A}$ is approximately equal to $\omega_1$:

$$(k_t+k)/m_1 = k_1/b_1,$$

where, $k_t$, k and $m_1$ are known parameters, and $k_1$ and $b_1$ are parameters to be determined.

Step 7: The values of parameters $k_1$ and $k_2$ are determined. Calculations and tests show that the performance of the passive skyhook and groundhook damping vibration isolation system disclosed by the present invention will be closer to that of an ideal skyhook and groundhook damping vibration isolation system if the values of $k_1$ and $k_2$ are smaller. However, too small values of $k_1$ and $k_2$ will result in a too large relative stroke between the mass $m_1$ 8 and the mass $m_2$ 1 and between the mass $m_1$ 8 and the moving foundation 11. To avoid a too large relative stroke, $k_1$ should be greater than or equal to k/3, and $k_2$ should be greater than or equal to k/3. Meanwhile, the values of $k_1$ and $k_2$ cannot be too large. Too large values of $k_1$ and $k_2$ will deteriorate the performance of the passive skyhook and groundhook damping vibration isolation system. Calculations and tests show that the performance of the passive skyhook and groundhook damping vibration isolation system disclosed by the present invention can be close to that of an ideal skyhook and groundhook damping vibration isolation system when $k_1$ is less than or equal to $k_t$ and $k_2$ is less than or equal to k. Therefore, in the case of $k_t/3 \leq k_1 \leq k_t$ and $k/3 \leq k_2 \leq k$, that is, $k_1$ is within $[k_t/3, k_t]$ and $k_2$ is within $[k/3, k]$, the passive skyhook and groundhook damping vibration isolation system can achieve the effects required by the present invention.

Step 8: The known parameters of the ideal 2DOF skyhook and groundhook damping vibration isolation system are as follows: the mass of the mass $m_1$ 8 is $m_1$, the mass of the mass $m_2$ 1 is $m_2$, the stiffness of the spring k 5 is k, the damping of the damper c 6 is c, the stiffness of the spring $k_t$ 9 is $k_t$, the damping of the damper $c_t$ 10 is $c_t$, the damping of the skyhook damper $c_{sky}$ 4 is $c_{sky}$, and the damping of the groundhook damper $c_{gnd}$ 7 is $c_{gnd}$. The values of $k_1$ and $k_2$ are selected from the ranges determined in Step 7, the specific values of parameters $b_1$ and $b_2$ are determined finally according to the relation of $k_2$ and $b_2$ determined in Step 3 and the relation of $k_1$ and $b_1$ determined in Step 6:

$$b_i = \frac{k_1}{(k_1+k)} m_1, \quad b_2 = \frac{k_2}{k} m_2.$$

For example, the known parameters of the conventional passive vibration isolation system are as follows: $m_2$=317.5 kg, k=22000N/m, c=1500N·s/m, $m_1$=45.4 kg, $k_t$=192000N/m, and $c_t$=0; the known parameters of the ideal skyhook and groundhook damping vibration isolation system are as follows: $c_{sky}$=2800N·s/m, $c_{gnd}$=3200N·s/m, and the other parameters are the same to those of the conventional passive vibration isolation system; and, in the passive skyhook and groundhook damping vibration isolation system, there are four parameters to be determined, including $k_1$, $b_1$, $k_2$ and $b_2$, and the other parameters all are known parameters and the same to those of the conventional passive vibration isolation system.

In this example, the method for determining parameters $k_1$, $b_1$, $k_2$ and $b_2$ of the 2DOF passive skyhook and groundhook damping vibration isolation system comprises the following steps:

Step 1: The resonance frequency $\omega_2$ of the mass $m_2$ 1 in the conventional 2DOF passive vibration isolation system is calculated according to the following equation:

$$\omega_2 = \sqrt{k/m_2} = \sqrt{22000/317.5}.$$

Step 2: The anti-resonance frequency $\omega_{2A}$ of the mass $m_2$ vibration state converting system 46 is calculated according to the following equation:

$$\omega_{2A} = \sqrt{k_2/b_2}.$$

Step 3: A relational expression of $k_2$ and $b_2$ is determined according to the principle that $\omega_{2A}$ is approximately equal to $\omega_2$:

$$22000/317.5 = k_2/b_2.$$

Step 4: The resonance frequency $\omega_1$ of the mass $m_1$ 8 in the conventional 2DOF passive vibration isolation system is calculated according to the following equation:

$$\omega_1 = \sqrt{(k_t+k)/m_1} = \sqrt{(192000+22000)/45.4} = \sqrt{214000/45.4}.$$

Step 5: The anti-resonance frequency $\omega_{1A}$ of the mass $m_1$ vibration state converting system 48 is calculated according to the following equation:

$$\omega_{1A} = \sqrt{k_1/b_1}.$$

Step 6: A relational expression of $k_1$ and $b_1$ is determined according to the principle that $\omega_{1A}$ is approximately equal to $\omega_1$:

$$214000/45.4 = k_1/b_1.$$

Step 7: The values of parameters $k_1$ and $k_2$ are determined. To avoid a too large relative stroke and to ensure that the performance of the passive skyhook and groundhook damping vibration isolation system will not be deteriorated, $k_1$ and $k_2$ should be selected from $[k_t/3, k_t]$ and $[k/3, k]$, respectively, that is, from [64000, 192000] and [7333, 22000], respectively. Here, $k_1=192000$N/m, and $k_2=15000$N/m.

Step 8: The specific values of parameters $b_1$ and $b_2$ are determined finally according to the relation of $k_2$ and $b_2$ determined in Step 3 and the relation of $k_1$ and $b_1$ determined in Step 6:

$$b_1 = \frac{k_1}{(k_1+k)}m_1 = \frac{192000}{214000} \times 45.4 = 40.7,$$

$$b_2 = \frac{k_2}{k}m_2 = \frac{15000}{22000} \times 317.5 = 216.5.$$

After the parameters $k_1$, $b_1$, $k_2$ and $b_2$ are determined, all parameters of the passive skyhook and groundhook damping vibration isolation system are obtained, including $m_2=317.5$ kg, $k=22000$N/m, $c=1500$N·s/m, $m_1=45.4$ kg, $k_t=192000$N/m, $c_t=0$, $c_{sky}=2800$N·s/m, $c_{gnd}=3200$N·s/m, $k_1=192000$N/m, $k_2=15000$N/m, $b_1=40.7$ kg, and $b_2=216.5$ kg.

After all parameters of the passive skyhook and groundhook damping vibration isolation system are determined by the above method, the ideal skyhook and groundhook damping vibration isolation system is realized passively, so that the damper is not required any more to be connected to an inertial reference frame. As a result, the technical bias that the damper in the ideal skyhook and groundhook damping vibration isolation system is required to be connected to an inertial reference frame is overcomed.

Figure 8:
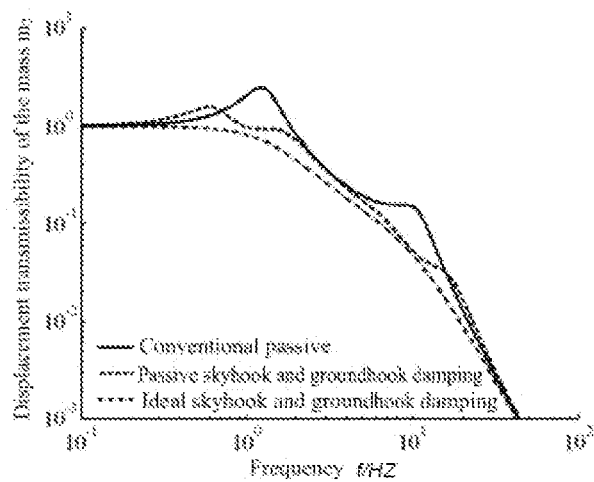
FIG. 8 is a graphical diagram of the displacement transmissibility of a mass $m_2$ in the 2DOF passive skyhook and groundhook damping vibration isolation system.

As shown in FIG. 8, on the curve of the displacement transmissibility of the mass $m_2$, there are two peaks in the conventional passive vibration isolation system. The two peaks are resulted from the resonance of the mass $m_2$ and mass $m_1$ at an inherent frequency, and the frequencies are 1.2 Hz and 10.2 Hz, respectively. Compared with the conventional passive vibration isolation system, the ideal skyhook and groundhook damping vibration isolation system and the passive skyhook and groundhook damping vibration isolation system have numerical values at 1.2 Hz decreased by 68.1% and 60%, respectively, and numerical values at 10.2 Hz decreased by 62.3% and 58%, respectively.

Figure 9:
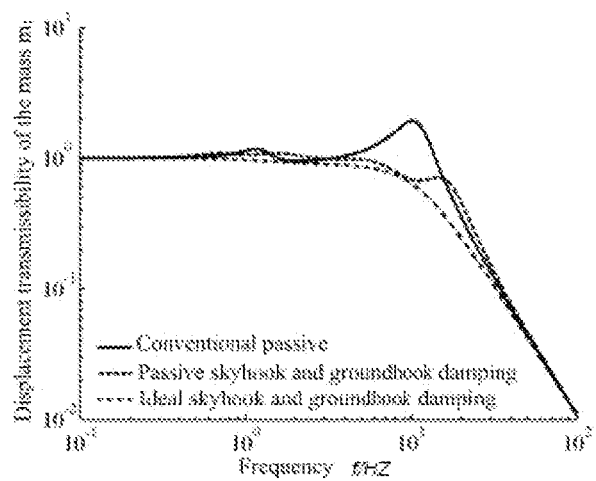
FIG. 9 is a graphical diagram of the displacement transmissibility of a mass $m_1$ in the 2DOF passive skyhook and groundhook damping vibration isolation system.

As shown in FIG. 9, on the curve of the displacement transmissibility of the mass $m_1$, there is a big peak in the conventional passive vibration isolation system. The peak is resulted from the resonance of mass $m_1$ at an inherent frequency, and the frequency is 10.2 Hz. Compared with the conventional passive vibration isolation system, the ideal skyhook and groundhook damping vibration isolation system and the passive skyhook and groundhook damping vibration isolation system have numerical values at this frequency decreased by 69.1% and 65.4%, respectively.

From the curves in FIG. 8 and FIG. 9 and the above analysis, it can be found that the ideal skyhook and groundhook damping vibration isolation system can suppress the resonance of the mass $m_2$ and mass $m_1$ completely, and the passive skyhook and groundhook damping vibration isolation system can suppress the resonance of the mass $m_2$ and mass $m_1$ well. The displacement transmissibility of the passive skyhook and groundhook damping vibration isolation system is close to that of the ideal skyhook and groundhook damping vibration isolation system. The vibration isolation performance of the two systems is superior to that of the conventional passive vibration isolation system apparently.

Figure 10:
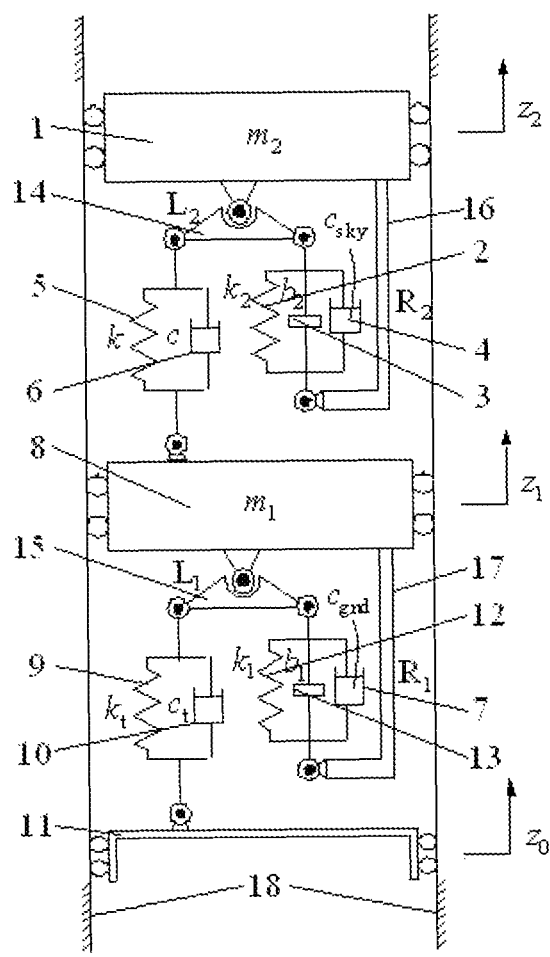
FIG. 10 is a schematic diagram of specific implementation way 1 of the 2DOF passive skyhook and groundhook damping vibration isolation system.

FIG. 10 shows the specific implementation way 1 of the 2DOF passive skyhook and groundhook damping vibration isolation system. The system comprises a mass $m_1$ 8 and a mass $m_2$ 1, a "spring k 5-damper c 6" parallel body, a "spring $k_t$ 9-damper $c_t$ 10" parallel body, a "spring $k_1$ 12-inerter $b_1$ 13" parallel body, a "spring $k_2$ 2-inerter $b_2$ 3" parallel body, a skyhook damper $c_{sky}$ 4, a groundhook damper $c_{gnd}$ 7, a moving foundation 11, a lever $L_1$ 15 and a lever $L_2$ 14, a fixed rod $R_1$ 17 and a fixed rod $R_2$ 16, and a slideway 18. The "spring k 5-damper c 6" parallel body consists of a spring k 5 and a damper c 6 connected in parallel. The "spring $k_t$ 9-damper $c_t$ 10" parallel body consists of a spring $k_t$ 9 and a damper $c_t$ 10 connected in parallel. The "spring $k_1$ 12-inerter $b_1$ 13" parallel body consists of a spring $k_1$ 12 and an inerter $b_1$ 13 connected in parallel. The "spring $k_2$ 2-inerter $b_2$ 3" parallel body consists of a spring $k_2$ 2 and an inerter $b_2$ 3 connected in parallel. The mass $m_2$ 1, the mass $m_1$ 8 and the moving foundation 11 are supported on the vertical slideway 18 in a rolling way to slide up and down along the vertical slideway 18. The fulcrum of the lever $L_2$ 14 is fixed on the mass $m_2$ 1. The upper end of the "spring k 5-damper c 6" parallel body is hinged to one end of the lever $L_2$ 14, while the lower end thereof is hinged to the mass $m_1$ 8. The upper end of the "spring $k_2$ 2-inerter $b_2$ 3" parallel body is hinged to the other end of the lever $L_2$ 14, while the lower end thereof is hinged to one end of the fixed rod $R_2$ 16. The other end of the fixed rod $R_2$ 16 is fixed on the mass $m_2$ 1. The fulcrum of the lever $L_1$ 15 is fixed on the mass $m_1$ 8, the upper end of the "spring $k_t$ 9-damper $c_t$ 10" parallel body is hinged to one end of the lever $L_1$ 15, while the lower end thereof is hinged to the moving foundation 11. The upper end of the "spring $k_1$ 12-inerter $b_1$ 13" parallel body is hinged to the other end of the lever $L_1$ 15, while the lower end thereof is hinged to one end of the fixed rod $R_1$ 17. The other end of the fixed rod $R_1$ 17 is fixed on the mass $m_1$ 8. The skyhook damper $c_{sky}$ 4 is connected in parallel to the inerter $b_2$ 3. The skyhook damper $c_{gnd}$ 7 is connected in parallel to the inerter $b_1$ 13.

Figure 11:
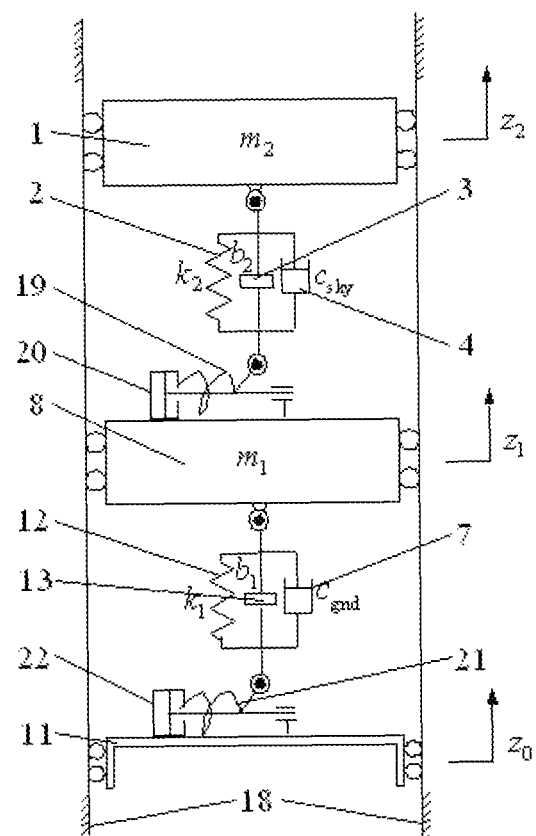
FIG. 11 is a schematic diagram of specific implementation way 2 of the 2DOF passive skyhook and groundhook damping vibration isolation system.

FIG. 11 shows the specific implementation way 2 of the 2DOF passive skyhook and groundhook damping vibration isolation system. The difference between the way 2 and the way 1 is that the lever $L_1$ 15 and the lever $L_2$ 14 are omitted, and a "torsion spring A 19-torsion damper A 20" parallel body and a "torsion spring B 21-torsion damper B 22" parallel body are used to replace the "spring k 5-damper c 6" parallel body and the "spring $k_t$ 9-damper $c_t$ 10" parallel body in form of tension and compression, respectively. The "torsion spring A 19-torsion damper A 20" parallel body consists of a torsion spring A 19 and a torsion damper A 20 connected in parallel, and has two common ends, one of which is fixedly connected to the mass $m_1$ 8 while the other one of which is hinged to one end of the "spring $k_2$ 2-inerter $b_2$ 3" parallel body. The other end of the "spring $k_2$ 2-inerter $b_2$ 3" parallel body is hinged to the mass $m_2$ 1. The "torsion spring B 21-torsion damper B 22" parallel body consists of a torsion spring B 21 and a torsion damper B 22 connected in parallel, and has two common ends, one of which is fixedly connected to the moving foundation 11 while the other one of which is hinged one end of the "spring $k_1$ 12-inerter $b_1$ 13" parallel body. The other end of the "spring $k_1$ 12-inerter $b_1$ 13" parallel body is hinged to the mass $m_1$ 8. The skyhook damper $c_{sky}$ 4 is connected in parallel to the inerter $b_2$ 3. The skyhook damper $c_{gnd}$ 7 is connected in parallel to the inerter $b_1$ 13.

Figure 12:
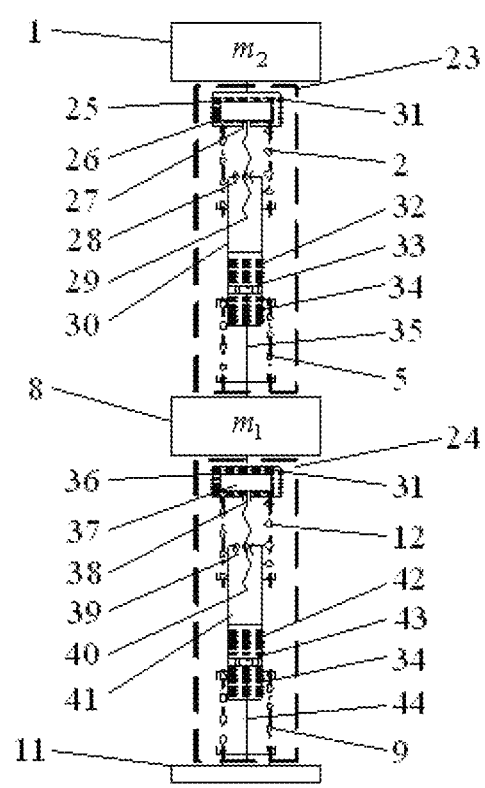
FIG. 12 is a schematic diagram of specific implementation way 3 of the 2DOF passive skyhook and groundhook damping vibration isolation system.

FIG. 12 shows the specific implementation way 3 of the 2DOF passive skyhook and groundhook damping vibration isolation system. The system comprises a mass $m_1$ 8 and a mass $m_2$ 1, a skyhook damping pillar 23, a groundhook damping pillar 24 and a moving foundation 11. One end of the skyhook damping pillar 23 is hinged to the mass $m_2$ 1, while the other end thereof is hinged to the mass $m_1$ 8. One end of the groundhook damping pillar 24 is hinged to the mass $m_1$ 8, while the other end thereof is hinged to the moving foundation 11.

The skyhook damping pillar 23 comprises a spring $k_2$ 2, an inerter $b_2$ 3, a skyhook damper $c_{sky}$ 4, a spring k 5 and a damper c 6. The inerter $b_2$ 3 is a ballscrew inerter comprising a flywheel chamber A 25, a flywheel A 26, a screw support A 27, a nut A 28, a screw A 29 and a stroke chamber A 30. One end of the screw A 29 is a screw portion, while the other end thereof is a threaded raceway portion and also has a polished rod portion adjacent to the screw portion. The flywheel A 26 is provided with a central threaded hole, and is in fitted connection with the screw portion of the screw A 29. The flywheel chamber A 25 is in a cylindrical shape with an open end and a closed end. The open end is fixedly sheathed on the outer circle of the screw support A 27 to ensure that the flywheel chamber A 25 is coaxial with the screw support A 27. A bearing is mounted within the screw support A 27. The outer ring of the bearing is fitted with an inner hole of the screw support A 27, while the inner ring thereof is fitted with the polished rod portion of the screw A 29, in order to ensure that the position of the screw support A 27 is kept unchanged in the axial direction and the radial direction with respect to the screw A 29 when the screw A 29 rotates with respect to the screw support A 27. The nut A 28 is meshed with the threaded raceway on the screw A 29. The stroke chamber A 30 is in a long cylindrical shape with an open end and a closed end. The open end is fixedly sheathed on the outer circle of the nut A 28 to ensure that the stroke chamber A 30 is coaxial with the nut A 28. The skyhook damper $c_{sky}$ 4 comprises the flywheel chamber A 25, the flywheel A 26 and viscous oil 31. The flywheel chamber is closed and filled with the viscous oil 31 therein. The flywheel A 26 rotates in the viscous oil 31 to generate viscous damping under the drive of the screw A 29. The damper c 6 comprises a cylinder A 32, a piston A 33 with a damping hole, oil 34 and a piston rod A 35. The cylinder A 32 is connected to the stroke chamber A 30 coaxially and fixedly. The spring k 5 is sheathed on the outer barrel of the cylinder A 32. One end of the spring k 5 is fixedly connected to one end of the piston rod A 35, while the other end thereof is fixedly connected to the outer barrel of the cylinder A 32. The spring $k_2$ 2 is sheathed on the outer barrel of the stroke chamber A 30. One end of the spring $k_2$ 2 is fixedly connected to the flywheel chamber A 25, while the other end thereof is fixedly connected to the stroke chamber A 30.

The groundhook damping pillar 24 comprises a spring $k_1$ 12, an inerter $b_1$ 13, a groundhook damper $c_{gnd}$ 7, a spring $k_t$ 9 and a damper $c_t$ 10. The inerter $b_1$ 13 is a ballscrew inerter comprising a flywheel chamber B 36, a flywheel B 37, a screw support B 38, a nut B 39, a screw B 40 and a stroke chamber B 41. The groundhook damper $c_{gnd}$ 7 comprises the flywheel chamber B 36, the flywheel B 37 and viscous oil 31. The damper $c_t$ 10 comprises a cylinder B 42, a piston B 43 with a damping hole, oil 34 and a piston rod B 44. The groundhook damping pillar 24 has the same structure as the skyhook damping pillar 23. The connection relation of all components of the groundhook damping pillar 24 may refer to the skyhook damping pillar 23.

Figure 13:
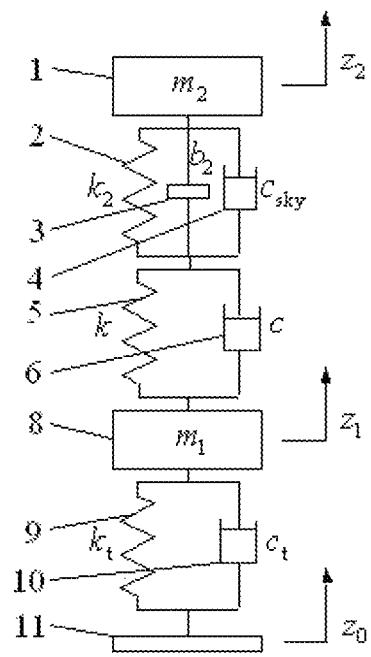
FIG. 13 is a schematic diagram of a 2DOF passive skyhook damping vibration isolation system.

Referring to FIG. 5, the parallel body of the mass $m_1$ vibration state converter 47 and the skyhook damper $c_{gnd}$ 7 in the 2DOF passive skyhook and groundhook damping vibration isolation system of the present invention is omitted, and two ends of the "spring $k_t$ 9-damper $c_t$ 10" parallel body are directly connected in series to the mass $m_1$ 8 and the moving foundation 11, respectively, to form a 2DOF passive skyhook damping vibration isolation system, as shown in FIG. 13.

Figure 14:
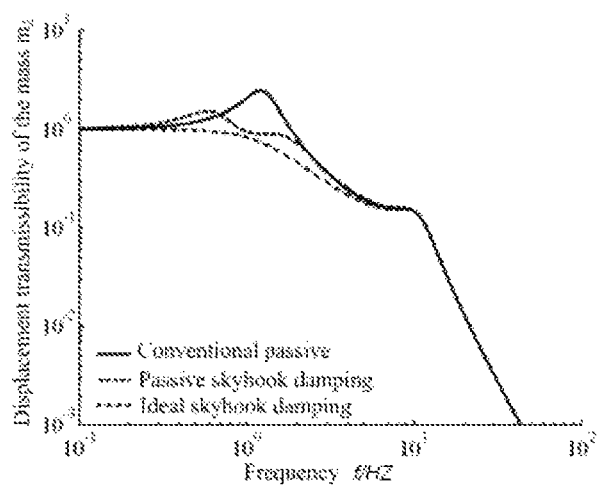
FIG. 14 is a graphical diagram of the displacement transmissibility of a mass $m_2$ in the 2DOF passive skyhook damping vibration isolation system.

FIG. 14 shows that there is a big peak on the curve of the displacement transmissibility of the mass $m_2$ in the conventional passive vibration isolation system. The peak is resulted from the resonance of the mass $m_2$ at an inherent frequency, and the frequency is 1.2 Hz. Compared with the conventional passive vibration isolation system, the ideal skyhook damping vibration isolation system and the passive skyhook damping vibration isolation system have numerical values at this frequency decreased by 69.7% and 63.7%, respectively. From the curve in FIG. 14 and the above analysis, it can be found that the ideal skyhook vibration isolation system can suppress the resonance of the mass $m_2$ completely, and the passive skyhook vibration isolation system can suppress the resonance of the mass $m_2$ well. The displacement transmissibility of the passive skyhook vibration isolation system is close to that of the ideal skyhook vibration isolation system. The vibration isolation performance of the two systems is superior to that of the conventional passive vibration isolation system apparently.

Figure 15:
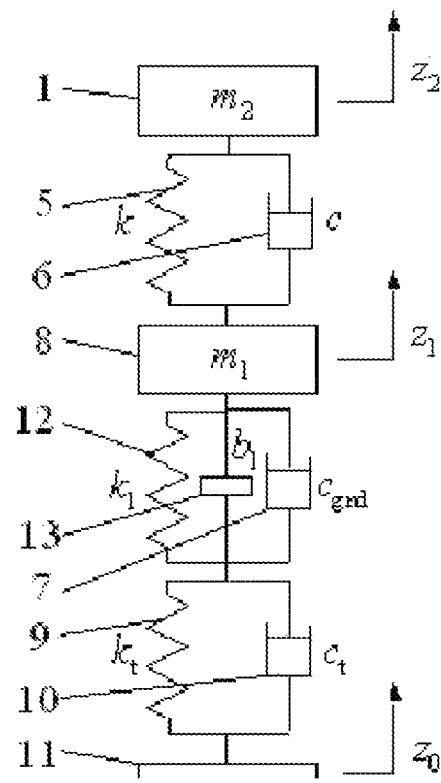
FIG. 15 is a schematic diagram of a 2DOF passive groundhook damping vibration isolation system.

Referring to FIG. 5, the parallel body of the mass $m_2$ vibration state converter 45 and the skyhook damper $c_{sky}$ 4 in the 2DOF passive skyhook and groundhook damping vibration isolation system of the present invention is omitted, and two ends of the "spring k 5-damper c 6" parallel body are directly connected in series to the mass $m_1$ 8 and the mass $m_2$ 1, respectively, to form a 2DOF passive groundhook damping vibration isolation system, as shown in FIG. 15.

Figure 16:
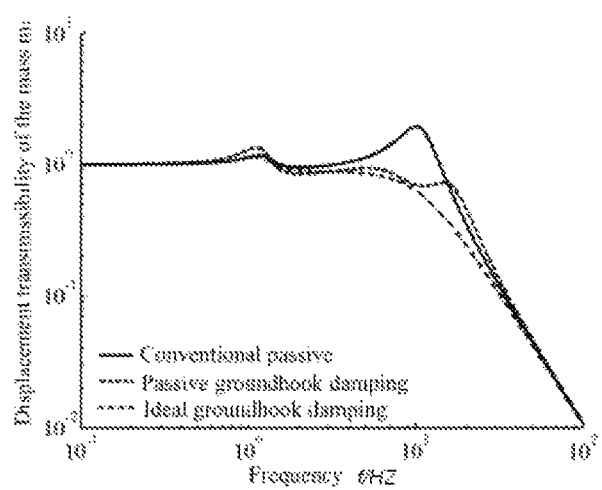
FIG. 16 is a graphical diagram of the displacement transmissibility of a mass $m_1$ in the 2DOF passive groundhook damping vibration isolation system.

FIG. 16 shows that there is a big peak on the curve of the displacement transmissibility of the mass $m_1$ in the conventional passive vibration isolation system. The peak is resulted from the resonance of the mass $m_1$ at the inherent frequency, and the frequency is 10.2 Hz. Compared with the conventional passive vibration isolation system, the ideal groundhook damping vibration isolation system and the passive groundhook damping vibration isolation system have numerical values at this frequency decreased by 67.6% and 64.2%, respectively. From the curve in FIG. 16 and the above analysis, it can be found that the ideal groundhook damping vibration isolation system can suppress the resonance of the mass $m_1$ completely, and the passive groundhook damping vibration isolation system can suppress the resonance of the mass $m_1$ well. The displacement transmissibility of the passive groundhook damping vibration isolation system is close to that of the ideal groundhook damping vibration isolation system. The vibration isolation performance of the two systems is superior to that of the conventional passive vibration isolation system apparently.

Figure 17:
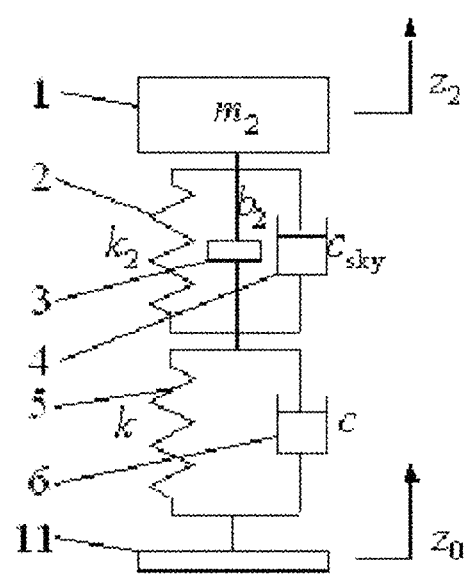
FIG. 17 is a schematic diagram of an SDOF passive skyhook damping vibration isolation system.

Referring to FIG. 5, the "spring $k_t$ 9-damper $c_t$ 10" parallel body, the parallel body of the mass $m_1$ vibration state converter 47 and the skyhook damper $c_{gnd}$ 7 and the mass $m_1$ 8 in the 2DOF passive skyhook and groundhook damping vibration isolation system of the present invention are omitted, and the "spring k 5-damper c 6" parallel body is directly connected in series to the moving foundation 11, to form an SDOF passive skyhook damping vibration isolation system, 5 as shown in FIG. 17.

The mass $m_2$ 1 and the mass $m_1$ 8 may be a vehicle body and vehicle wheels, seats and a vehicle body, a cab and a vehicle body, or seats and a cab.

In addition, the implementation methods and the vibration systems disclosed by the present invention are not limited to SDOF and 2DOF, and may also be expanded to multiple degrees of freedom. The implementation methods and the vibration systems disclosed by the present invention are also not limited to the form of translation, and may also be in the form of rotation. The translational elements may be replaced with rotational and torsional elements.

The foregoing detailed descriptions of the specific implementation ways are provided to illustrate how to preferably implement the present invention, and shall not be regarded as any limitation to the scope of the present invention. For those skilled in the art, various modifications or variations may be made easily to the present invention according to the method given by the present invention to achieve the performance level of the prevent invention. Therefore, any modifications and variations shall fall into the scope defined by the claims of the present invention.

What is claimed is:

1. A 2DOF passive skyhook and groundhook damping vibration isolation system, the system comprising:
a spring k-damper c parallel body, a spring $k_t$-damper $c_t$ parallel body, a skyhook damper $c_{sky}$, a groundhook damper $c_{gnd}$, a moving foundation, a mass $m_1$ vibration state converting system, and a mass $m_2$ vibration state converting system;
wherein the spring $k_t$-damper $c_t$ parallel body consists of a spring $k_t$ and a damper $c_t$ connected in parallel; the mass $m_1$ vibration state converting system comprises a mass $m_1$ and a mass $m_1$ vibration state converter, the mass $m_1$ vibration state converter consisting of a spring $k_1$ and an inerter $b_1$ connected in parallel, the mass $m_1$ vibration state converter being connected in series to and supporting the mass $m_1$; the spring $k_t$-damper $c_t$ parallel body is connected in series to the mass $m_1$ vibration state converter and supports the whole mass $m_1$ vibration state converting system via the mass $m_1$ vibration state converter; the moving foundation is connected in series to and supports the spring $k_t$-damper $c_t$ parallel body; the groundhook damper $c_{gnd}$ is connected in parallel to the mass $m_1$ vibration state converter to form the parallel body of the mass $m_1$ vibration state converter and the groundhook damper $c_{gnd}$;
wherein the spring k-damper c parallel body consists of a spring k and a damper c connected in parallel; the mass $m_2$ vibration state converting system comprises a mass $m_2$ and a mass $m_2$ vibration state converter, the mass $m_2$ vibration state converter consisting of a spring $k_2$ and an inerter $b_2$ connected in parallel, the mass $m_2$ vibration state converter being connected in series to and supporting the mass $m_2$; the spring k-damper c parallel body is connected in series to the mass $m_2$ vibration state converter, and supports the whole mass $m_2$ vibration state converting system via the mass $m_2$ vibration state converter; the mass $m_1$ is connected in series to and supports the spring k-damper c parallel body; the skyhook damper $c_{sky}$ is connected in parallel to the mass $m_2$ vibration state converter to form the parallel body of the mass $m_2$ vibration state converter and the skyhook damper $c_{sky}$;
wherein in the 2DOF passive skyhook and groundhook damping vibration isolation system, the mass of the mass $m_2$ is $m_2$, the stiffness of the spring $k_2$ is $k_2$, the inerterance of the inerter $b_2$ is $b_2$, the damping of the skyhook damper $c_{sky}$ is $c_{sky}$, the stiffness of the spring k is k, the damping of the damper c is c; the mass of the mass $m_1$ is $m_1$,
the stiffness of the spring $k_1$ is $k_1$, the inerterance of the inerter $b_1$ is $b_1$, the damping of the groundhook damper $c_{gnd}$ is $c_{gnd}$, the stiffness of the spring $k_t$ is $k_t$, and the damping of the damper $c_t$ is $c_t$,
wherein $k_1$ and $k_2$ are selected, as a result $k_t/3 \le k_1 \le k_t$ and $k/3 \le k_2 \le k$, $$b_1 = \frac{k_1}{(k_1+k)}m_1$$

and $$b_2 = \frac{k_2}{k}m_2.$$

2. The 2DOF passive skyhook and groundhook damping vibration isolation system according to claim 1, wherein the mass $m_2$ comprises a vehicle body, and the mass $m_1$ comprises vehicle wheels.

3. The 2DOF passive skyhook and groundhook damping vibration isolation system according to claim 1, wherein the mass $m_2$ comprises seats, and the mass $m_1$ comprises a vehicle body.

4. The 2DOF passive skyhook and groundhook damping vibration isolation system according to claim 1, wherein the mass $m_2$ comprises a cab, and the mass $m_1$ comprises a vehicle body.

5. The 2DOF passive skyhook and groundhook damping vibration isolation system according to claim 1, wherein the mass $m_2$ comprises seats, and the mass $m_1$ comprises a cab.

6. The 2DOF passive skyhook and groundhook damping vibration isolation system according to claim 1, wherein the parallel body of the mass $m_1$ vibration state converter and the groundhook damper $c_{gnd}$ and the "spring $k_t$-damper $c_t$" parallel body are exchanged in position with each other.

7. The 2DOF passive skyhook and groundhook damping vibration isolation system according to claim 1, wherein the parallel body of the mass $m_2$ vibration state converter and the skyhook damper $c_{sky}$ and the spring k-damper c parallel body are exchanged in position with each other.

8. The 2DOF passive skyhook and groundhook damping vibration isolation system according to claim 1 the inerter $b_2$ and the inerter $b_1$ are rack and pinion inerters, ballscrew inerters or hydraulic inerters.

9. The 2DOF passive skyhook and groundhook damping vibration isolation system according to claim 1, further comprising a lever $L_1$ and a lever $L_2$, a fixed rod $R_1$ and a fixed rod $R_2$, and a slideway, the mass $m_2$, the mass $m_1$ and the moving foundation being supported on the vertical slideway in a rolling way to slide up and down along the vertical slideway, the fulcrum of the lever $L_2$ being fixed on the mass $m_2$, the upper end of the spring k-damper c parallel body being hinged to one end of the lever $L_2$ while the lower end thereof being hinged to the mass $m_1$, the upper end of the spring $k_2$-inerter $b_2$ parallel body being hinged to the other end of the lever $L_2$ while the lower end thereof being hinged to one end of the fixed rod $R_2$, the other end of the fixed rod $R_2$ being fixed on the mass $m_2$, the fulcrum of the lever $L_1$ being fixed on the mass $m_1$, the upper end of the spring $k_t$-damper $c_t$ parallel body being hinged to one end of the lever $L_1$ while the lower end thereof being hinged to the moving foundation, the upper end of the spring $k_1$-inerter $b_1$ parallel body being hinged to the other end of the lever $L_1$ while the lower end thereof being hinged to one end of the fixed rod $R_1$, the other end of the fixed rod $R_1$ being fixed on the mass $m_1$.

10. The 2DOF passive skyhook and groundhook damping vibration isolation system according to claim 9, wherein a torsion spring A-torsion damper A parallel body and a torsion spring B-torsion damper B parallel body are used to replace the "spring k-damper c" parallel body and the spring $k_t$-damper $c_t$ parallel body; the torsion spring A-torsion damper A parallel body consists of a torsion spring A and a torsion damper A connected in parallel, and has two common ends, one of which being fixedly connected to the mass $m_1$ while the other one of which being hinged to one end of the spring $k_2$-inerter $b_2$ parallel body, the other end of the spring $k_2$-inerter $b_2$ parallel body being hinged to the mass $m_2$; the torsion spring B-torsion damper B parallel body consists of a torsion spring B and a torsion damper B connected in parallel, and has two common ends, one of which being fixedly connected to the moving foundation while the other one of which being hinged one end of the spring $k_1$-inerter $b_1$ parallel body, the other end of the spring $k_1$-inerter $b_1$ parallel body being hinged to the mass $m_1$.

11. A 2DOF passive groundhook damping vibration isolation system, wherein the parallel body of the mass $m_2$ vibration state converter and the skyhook damper $c_{sky}$ in the 2DOF passive skyhook and groundhook damping vibration isolation system according to claim 1 is omitted, and two ends of the "spring k-damper c" parallel body are directly connected in series to the mass $m_1$ and the mass $m_2$, respectively.

12. A 2DOF passive skyhook damping vibration isolation system, wherein the parallel body of the mass $m_1$ vibration state converter and the skyhook damper $c_{gnd}$ in the 2DOF passive skyhook and groundhook damping vibration isolation system according to claim 1 is omitted, and two ends of the spring $k_t$-damper $c_t$ parallel body are directly connected in series to the mass $m_1$ and the moving foundation, respectively.

13. An SDOF passive skyhook damping vibration isolation system, wherein the spring $k_t$-damper $c_t$ parallel body, the parallel body of the mass $m_1$ vibration state converter and the skyhook damper $c_{gnd}$ and the mass $m_1$ in the 2DOF passive skyhook and groundhook damping vibration isolation system according to claim 1 are omitted, and the spring k-damper c parallel body is directly connected in series to the moving foundation.

* * * * *